2,725,332

2,3-DIALKOXY-5,6-P-DIOXANETHIOL S,S-(O,O-DIALKYL PHOSPHORODITHIOATE)

George Allen Buntin, Wilmington, Del., assignor to Hercules Powder Company, Wilmington, Del., a corporation of Delaware No Drawing. Application December 20, 1954, Serial No. 476,570

8 Claims. (Cl. 167—33)

This invention relates to new and useful organic thiophosphate compounds and to pesticidal compositions containing the same.

The novel organic thiophosphate compounds of this invention have the general formula:

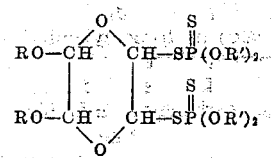

in which each R and R' represents a lower alkyl radical or chloro lower alkyl radical.

These organic thiophosphate compounds have pesticidal properties and distinguish themselves from known pesticidal compounds in being more toxic at low concentrations toward certain pests and in having a much longer residual toxicity toward mites when sprayed on plants normally attacked by such pests.

The organic thiophosphate compounds of this invention are made by reacting 2,3-dialkoxy dichloro-p-dioxane or 2,3-dialkoxy dibromo-p-dioxane with the desired diester of dithiophosphoric acid, the latter being the product of reaction of a lower aliphatic alcohol or a mixture of lower aliphatic alcohols of the formula R'OH and $P_2S_5$. The diester of dithiophosphoric acid may be reacted directly with the 2,3-dialkoxy dihalo-p-dioxane or it may be reacted in the form of its salt or in the presence of materials which sequester the hydrogen halide set free in the reaction. The 2,3-dialkoxy dihalo-p-dioxane from which the products of this invention are produced are obtained by reacting 2,3-dichloro-p-dioxane with an alcohol ROH and halogenating the resulting 2,3-dialkoxy-p-dioxane.

The methods of making the products of this invention and methods of using the products as pesticides are more particularly described in the following examples in which all parts and percentages are by weight.

Examples

Preparation of 2,3-diethoxy-p-dioxane.—A solution of 157 parts 2,3-dichloro-p-dioxane in 160 parts dry toluene and 110 parts anhydrous ethanol was refluxed at about 80° C. for 30 hours during which time hydrogen chloride was evolved. The toluene and excess ethanol were then distilled off under reduced pressure. A fraction amounting to 139 parts was obtained as a water-white liquid boiling at 100–110° C. at 18 mm. on distilling the residue. It contained a small amount of residual chlorine but was chiefly 2,3-diethoxy-p-dioxane.

Clorination of 2,3-diethoxy-p-dioxane.—Into a solution of 53 parts 2,3-diethoxy-p-dioxane in about 150 parts carbon tetrachloride was passed 60.5 parts chlorine gas over a 2-hour period while heating the mixture at 76–78° C. in the presence of ultraviolet light. The resulting solution was distilled under reduced pressure to obtain 15 parts of a water-white liquid boiling at 75–95° C. at 2.2 mm. and analyzing 28.9% chlorine. This product on hydrolysis gives glyoxal, identified as the osazone from 2,4-dinitrophenylhydrazine, and is believed to be 2,3-diethoxy-5,6-dichloro-p-dioxane.

Preparation of 2,3-diethoxy-p-dioxanedithiol S,S-(O,O-diethyl phosphorodithioate).—To 21 parts diethyldithiophosphoric acid in about 160 parts benzene was added dropwise at 30–40° C. 8.6 parts pyridine. To the resulting solution was added 12.5 parts 2,3-diethoxydichloro-p-dioxane and the mixture was heated at about 80° C. under reflux for 4 hours. After cooling the reaction mixture, about 200 parts 15% aqueous sodium chloride was added to remove the pyridine hydrochloride in the reaction mixture. The organic layer was further washed with 5% sodium carbonate solution and 15% aqueous sodium chloride solution and finally dried over sodium sulfate. The solvents were then distilled off under reduced pressure to obtain 23 parts residue as a red liquid which as 2,3-diethoxy-p-dioxanedithiol S,S-(O,O-diethyl phosphorothioate) analyzing 9.8% P and 21.2% S. This product corresponds to the general formula wherein each R is ethyl and each R' is ethyl.

Following the general procedure outlined above, 2,3-dimethoxy-p-dioxane, 2,3-diisopropoxy-p-dioxane, 2,3-di-n-propoxy-p-dioxane, 2,3-di-n-butoxy-p-dioxane, 2,3-di-sec-butoxy-p-dioxane, 2,3-diisobutoxy-p-dioxane, 2,3-bis-($\beta$-chloroethyl)-p-dioxane and 2,3-bis-($\beta$-trichloroethyl)-p-dioxane are made by substituting for the ethanol, methyl alcohol, isopropyl alcohol, n-propyl alcohol, n-butyl alcohol, sec-butyl alcohol, isobutyl alcohol, $\beta$-chloroethyl alcohol and $\beta$-trichloroethyl alcohol, respectivey. These 2,3-dialkoxy-p-dioxanes are all readily chlorinated to the corresponding dichloro-2,3-dialkoxy-p-dioxanes following the outlined procedure for chlorination of 2,3-diethoxy-p-dioxane. The dichloro-2,3-dialkoxy-p-dioxanes are all readily reacted with dialkyldithiophosphoric acids in the manner set forth above for reaction of 2,3-diethoxydichloro-p-dioxane with diethyldithiophosphoric acid.

The dialkyldithiophosphoric acids are prepared by the reaction of the desired alcohol R'OH with $P_2S_5$ in the manner well known in the art. Alcohols which are useful in this connection are methyl alcohol, ethyl alcohol, isopropyl alcohol, n-propyl alcohol, n-butyl alcohol, sec-butyl alcohol, isobutyl alcohol, $\beta$-chloroethyl alcohol, and $\beta$-trichloroethyl alcohol.

The 2,3-dialkoxy-p-dioxanedithiol S,S-(O,O-dialkyl phosphorodithioates) produced in accordance with this invention are compounds of the general formula in which each R and R' is an alkyl group having 1–4 carbon atoms and all have strong insecticidal activity as exemplified by the results tabulated below:

| Example | Character of R and R' in Compound of General Formula | | Percent Kill Two-spotted Mite, 0.2% | Systemic Activity, Percent Kill Pea Aphids |
|---|---|---|---|---|
| | R | R' | | |
| 1 | Ethyl | Ethyl | 100 | 90 |
| 2 | Isopropyl | do | 90 | 30 |
| 3 | Butyl | do | 90 | 60 |
| 4 | Ethyl | Butyl | 100 | 40 |
| 5 | Isopropyl | do | 90 | 80 |
| 6 | Butyl | do | 90 | 70 |
| 7 | Ethyl | Methyl | 100 | 100 |
| 8 | do | $\beta$-Chloroethyl | 100 | 30 |
| 9 | do | $\beta$-Trichloroethyl | 80 | 80 |

The compound of Example 1 also showed 100% kill against houseflies and against pea aphids when used at 0.1% concentration in aqueous emulsion and 100% kill against Mexican bean beetles and against Southern army worms when used at 1.0% concentration.

In carrying out the insecticidal tests on the compounds of this invention, emulsifiable concentrates of the compounds were made by mixing 1 gram of the residue with 1 ml. benzene and 1 ml. sorbitan monolaurate polyoxyalkylene derivative (Tween 20). The concentrate was then diluted with water to form dispersions of the residue in water varying in concentration from 1.0% to 0.00025%. The dispersions were then tested for their toxicity to caged insects and to mites not only by spraying the insects but by spraying the plants alone as well for the purpose of determining residual toxicity. Standard test methods were used for obtaining the results tabulated below.

Tests on systemic activity were carried out by placing a freshly cut slip of a pea plant in water containing 50 parts per million of the compound tested for 24 hours and infesting with pea aphids. The per cent kill was determined after 48 hours.

The organic dithiophosphate compounds of this invention have the formula

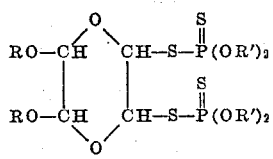

in which each R and R' is the same or a different organic radical such as a lower alkyl radical: methyl, ethyl, n-propyl, isopropyl, isobutyl, sec-butyl and n-butyl, and chlorine substituted lower alkyl radicals. In the above definition of the scope of the compounds of this invention, "lower alkyl" is defined to include those alkyl radicals with 1 to 4 carbon atoms.

In producing 2,3-dialkoxy-p-dioxanes from which the insecticidal compounds of this invention are produced, the 2,3-dichlorodioxane is reacted with the alcohol ROH or the corresponding alkoxide ROMe where Me is an alkali or alkaline earth metal. When ROH is reacted with the 2,3-dihalo-p-dioxane, hydrogen chloride is liberated and may be driven off as a gas or it may be sequestered in situ with a suitable sequestering agent such as pyridine, triethylamine, dimethylaniline, or other tertiary amine. The reaction is conducted in the absence of water to avoid hydrolysis of the halogen on the dioxane ring and the sequestering agent is preferably anhydrous. The sequestering agent may, furthermore, be added gradually during the course of the reaction to avoid causing hydrolysis. As a further means of effecting complete substitution, an excess of the alcohol ROH is preferably maintained in the reaction mixture. Moreover, the alcohol can be continuously distilled off as a means of carrying away the halogen acid which is liberated and fresh alcohol ROH may be added continuously to replace that distilled off.

2,3-dialkoxy-5,6-dichloro-p-dioxane is readily obtained from the 2,3-dialkoxy-p-dioxane by chlorination with chlorine gas at a temperature at which chlorination will take place but below temperatures at which decomposition is noticeable. Chlorination temperatures in the range of 20° to 200° C. are suitable. The chlorination may be carried out in the presence or absence of solvents. When a solvent is used, suitable solvents include: chloroform, carbon tetrachloride, nitrobenzene and pentachloroethane.

In producing the compounds of this invention, the reaction between the 2,3-dichloro-5,6-dialkoxy-p-dioxane or 2,3-dibromo-5,6-dialkoxy-p-dioxane and the ester of dithiophosphoric acid or its salt is carried out by heating the two reactants at a temperature at which reaction takes place but below the decomposition temperature in the range of 20° to 200° C., preferably in the range of 30° to 110° C. The reactants may be mixed in any desired order. In order to get complete reaction, it is preferable to use an excess over the theoretical amount of the ester of the dithiophosphoric acid. When the reaction is complete, the excess ester of the dithiophosphoric acid is readily removed by washing with water containing sufficient alkali to produce the water-soluble salt.

The reaction with the ester of dithiophosphoric acid is preferably carried out in nonaqueous media. Organic solvents are desirable to aid in control of the rate of reaction, Suitable solvents include benzene, toluene, xylene, cyclohexane, hexane, anhydrous alcohol solvents and dioxane. It is preferable to use hydrocarbon solvents when using an amine salt of the dithiophosphoric acid ester or when using an amine or ammonia as a sequestering reagent. After the reaction is complete, the solvent is readily removed by distillation.

When the diester of dithiophosphoric acid is used as the free acid in the reaction with the 2,3-dihalo-5,6-dialkoxy-p-dioxane, hydrogen halide which is liberated is preferably sequestered by adding a material to combine with the hydrogen halide as formed. It is convenient to use pyridine for this purpose. However, in its place other tertiary organic amines may be used, and they may be added in equivalent amount at the beginning of the reaction or gradually during the course of the reaction. Likewise, the amine can be reacted with the diester of the dithiophosphoric acid prior to carrying out the reaction with the 2,3-dihalo-5,6-dialkoxy-p-dioxane as in the examples. Amines which can be used include pyridine, tertiary alkylamines such as trimethylamine, tributylamine, triamylamine, dimethylaniline, and the like. Inorganic bases may also be used. These include ammonia, alkali metal hydroxides, carbonates and bicarbonates, and alkaline earth metal hydroxides and carbonates.

As in the case of organic bases, the inorganic bases may also be used first to form a salt of the ester of the dithiophosphoric acid. When the salt of the ester of dithiophosphoric acid is used as the reactant, it is preferable to use a salt which is soluble in the organic solvent used for the reaction. The organic salts of amines are particularly satisfactory because of the good solubility of these salts in the nonreactive hydrocarbon solvents. When the free acid is reacted with the 2,3-dihalo-5,6-dialkoxy-p-dioxane, the alkaline material is preferably added gradually as needed but it can be added all at once if desired. Ammonia is suitably added gradually as a gas, the solids are suitably added in finely divided form.

The dithiophosphoric acid ester is produced by reacting the lower aliphatic alcohol, which is to form a part of the ester, with $P_2S_5$ preferably in a nonreactive solvent such as benzene, toluene, xylene, hexane or cyclohexane and removing the $H_2S$ which is liberated. The reaction is carried out at any temperature in the range of 50° to 120° C., selecting the lowest practical temperature without decomposition. If different radicals are desired for the various R radicals, a mixture of alcohols may be used in the production of the dithiophosphoric acid ester. Likewise, dithiophosphoric acid esters produced from different alcohols can be mixed for use in the reaction with the 2,3-dihalo-5,6-dialkoxy-p-dioxane.

The methods by which the products of this invention are isolated will vary slightly with the reactants used and the product produced. In some instances the chloride salt split out in the reaction separates and can be filtered off. In other instances the chloride salt is best removed by washing with water. The excess salt of the ester of dithiophosphoric acid is also removed by the water wash. The benzene or other solvent is then removed by distillation leaving an insecticidally active residue. Further purification by selective solvent extraction or by adsorptive agents such as activated carbon, or clays, can precede the removal of the solvent. Likewise, an organic solvent can be added to aid in the purification by adsorptive agents. However, the product is generally satisfactory for use as a pesticide without further purification.

The compounds of this invention are used as the sole toxic agent in pesticidal formulations or in admixture with other toxicants for modification of the properties of the individual toxicants. They may be used, for example, in admixture with toxaphene, DDT, Thanite, chlordane, rotenone, pyrethrin, and the like, in many of the formulations suggested below.

The compounds of this invention are made into pesticidal compositions for use against insects and mites by dilution with an insecticidal adjuvant as a carrier therefor, by dispersing in an organic solvent, or in water, or by diluting with a solid insecticidal adjuvant as a carrier. Dispersions containing a surface-active dispersing agent have the advantage of spreading the toxic substance more effectively over the plant surface. Dispersions in organic solvents include dispersions in alcohols, pint oil, hydrocarbon solvents, difluorodichloromethane, and similar organic solvents. The compounds of this invention are also used in aerosol formulations in which difluorodichloromethane and similar aerosol propellents form the propellant vehicle.

Aqueous dispersions are made up from the compounds of this invention, a surface-active dispersing agent and water as the essential ingredients. The amount of the compounds of this invention in the aqueous dispersions when diluted for spraying of plants will be in the range of 10.0% to about 0.0001% of the aqueous dispersion.

The aqueous dispersion will ordinarily be made up from a concentrate, and the concentrate will be dispersed in water to the proper concentration for application to the plants to be treated in the field. The concentrate is composed essentially of the compound of this invention and surface-active dispersing agent. The concentrate may also contain sufficient organic solvents to aid in effective dispersion. The amount of surface-active dispersing agent used is usually at least 5% of the amount of toxic compound in the concentrate.

Suitable surface-active dispersing agents for use in the compositions of this invention are those disclosed in Chemistry of Insecticides, Fungicides and Herbicides (by Donald E. H. Frear, second edition (1948), pages 280–287) for use with known insecticides and include neutral soaps of resin, alginic and fatty acids and alkali metals or alkylamines or ammonia, saponins, gelatins, milk, soluble casein, flour and soluble proteins thereof, sulfite lye, lignin pitch, sulfite liquor, longchain fatty alcohols having 12–18 carbon atoms and alkali metal salts of the sulfates thereof, salts of sulfated fatty acids, salts of sulfonic acids, esters of long-chain fatty acids and polyhydric alcohols in which alcohol groups are free, clays such as fuller's earth, China clay, kaolin, attapulgite, and bentonite and related hydrated aluminum silicates having the property of forming a colloidal gel. Among the other surface-active dispersing agents which are useful in the compositions of this invention are the omega-substituted polyethylene glycols of relatively long-chain length, particularly those in which the omega substituent is aryl, alkyl, or acyl. Compositions of the toxic material and surface-active dispersing agent will in some instances have more than one surface-active dispersing agent for a particular type of utility, or in addition to a surface-active dispersing agent, hydrocarbons such as kerosene and mineral oil will also be added as improvers. Thus, the toxic material may contain a clay as the sole adjuvant or clay and hydrocarbon, or clay and another surface-active dispersing agent to augment the dispersing action of the clay. Likewise, the toxic material may have water admixed therewith along with the surface-active dispersing agent, sufficient generally being used to form an emulsion. All of these compositions of toxic material and surface-active dispersing agent may contain in addition synergists and/or adhesive or sticking agents.

What I claim and desire to protect by Letters Patent is:

1. As a new composition of matter a compound of the formula

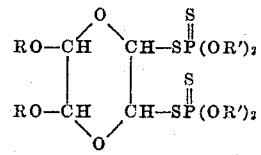

in which each R and R' represents a radical of the group consisting of lower alkyl and chloro lower alkyl.

2. As a new composition of matter a compound of the formula

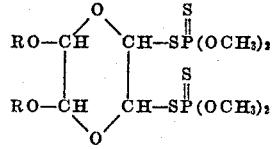

in which each R represents a radical of the group consisting of lower alkyl and chloro lower alkyl.

3. As a new composition of matter a compound of the formula

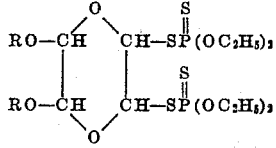

in which each R represents a radical of the group consisting of lower alkyl and chloro lower alkyl.

4. As a new composition of matter a compound of the formula

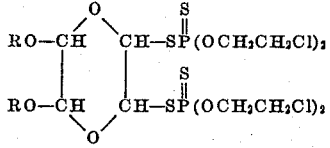

in which each R represents a radical of the group consisting of lower alkyl and chloro lower alkyl.

5. A pesticidal composition comprising the compound of claim 1 and an insecticidal adjuvant.

6. A pesticidal composition comprising the compound of claim 2 and an insecticidal adjuvant.

7. A pesticidal composition comprising the compound of claim 3 and an insecticidal adjuvant.

8. A pesticidal composition comprising the compound of claim 4 and an insecticidal adjuvant.

References Cited in the file of this patent

UNITED STATES PATENTS

| | | |
|---|---|---|
| 2,529,304 | Mikeska | Nov. 7, 1950 |
| 2,531,129 | Hook | Nov. 21, 1950 |
| 2,542,604 | Weisel | Feb. 20, 1951 |
| 2,565,920 | Hook | Aug. 28, 1951 |
| 2,565,921 | Hook | Aug. 28, 1951 |